(12) United States Patent
Biddick et al.

(10) Patent No.: US 12,291,950 B2
(45) Date of Patent: May 6, 2025

(54) DOWNHOLE LUBRICATION SYSTEM

(71) Applicant: Upwing Energy, LLC, Cerritos, CA (US)

(72) Inventors: David Biddick, Houston, TX (US); Patrick McMullen, Yorba Linda, CA (US); Christopher Matthew Sellers, Fullerton, CA (US); Herman Artinian, Huntington Beach, CA (US)

(73) Assignee: Upwing Energy, LLC, Cerritos, CA (US)

( * ) Notice: Subject to any disclaimer, the term of this patent is extended or adjusted under 35 U.S.C. 154(b) by 0 days.

(21) Appl. No.: 18/400,558

(22) Filed: Dec. 29, 2023

(65) Prior Publication Data

US 2024/0133278 A1    Apr. 25, 2024

Related U.S. Application Data

(62) Division of application No. 16/913,642, filed on Jun. 26, 2020, now Pat. No. 11,859,474.

(60) Provisional application No. 62/991,452, filed on Mar. 18, 2020.

(51) Int. Cl.
| | | |
|---|---|---|
| *E21B 43/12* | (2006.01) | |
| *F04D 13/02* | (2006.01) | |
| *F04D 13/06* | (2006.01) | |
| *F04D 13/08* | (2006.01) | |
| *F04D 13/10* | (2006.01) | |
| *F04D 29/06* | (2006.01) | |
| *H02K 7/14* | (2006.01) | |

(52) U.S. Cl.
CPC .......... *E21B 43/128* (2013.01); *F04D 13/024* (2013.01); *F04D 13/0606* (2013.01); *F04D 13/086* (2013.01); *F04D 13/10* (2013.01); *F04D 29/061* (2013.01); *H02K 7/14* (2013.01)

(58) Field of Classification Search
CPC .. E21B 43/128; F04D 13/024; F04D 13/0606; F04D 13/086; F04D 13/10; F04D 29/061; H02K 7/14; H02K 5/132
See application file for complete search history.

(56) References Cited

U.S. PATENT DOCUMENTS

| | | |
|---|---|---|
| 4,276,002 A | 6/1981 | Anderson |
| 4,541,782 A | 9/1985 | Mohn |
| 5,265,682 A | 11/1993 | Russell et al. |
| (Continued) | | |

OTHER PUBLICATIONS

U.S. Appl. No. 16/381,930, filed Apr. 11, 2019, Biddick et al.
International Search Report and Written Opinion in International Appln. No. PCT/US2021/023027, dated Jun. 30, 2021, 19 pages.

*Primary Examiner* — Dominick L Plakkoottam
(74) *Attorney, Agent, or Firm* — Fish & Richardson P.C.

(57) ABSTRACT

An electric machine is configured to be positioned within a wellbore. The electric machine enclosed within a housing isolates the electric machine from fluids within the wellbore. A first lubrication circuit includes a lubrication reservoir within the housing. The lubrication reservoir is fluidically connected to the electric machine. The first lubrication circuit is configured to provide lubrication to a bearing within the electric machine. A fluid rotor is configured to move or be moved by a fluid within the wellbore. A magnetic coupling couples the fluid rotor and a rotor of the electric machine to rotate in unison. A second lubrication circuit is configured to provide lubrication to a bearing supporting the fluid rotor.

7 Claims, 6 Drawing Sheets

(56) References Cited

U.S. PATENT DOCUMENTS

| | | | |
|---|---|---|---|
| 8,523,540 B2* | 9/2013 | Eide | F04D 29/586 |
| | | | 417/423.5 |
| 9,964,113 B2 | 5/2018 | Westberg et al. | |
| 10,036,389 B2 | 7/2018 | Li et al. | |
| 10,900,285 B2 | 1/2021 | Biddick et al. | |
| 11,859,474 B2 | 1/2024 | Biddick et al. | |
| 2002/0011337 A1 | 1/2002 | Grant | |
| 2004/0144534 A1* | 7/2004 | Lee | F04D 13/10 |
| | | | 166/66.4 |
| 2011/0073316 A1 | 3/2011 | Camargo | |
| 2013/0136634 A1 | 5/2013 | Saele | |
| 2015/0354574 A1* | 12/2015 | Homstvedt | F04D 13/024 |
| | | | 417/423.3 |
| 2016/0168964 A1* | 6/2016 | Li | H02K 49/106 |
| | | | 417/420 |
| 2016/0333677 A1* | 11/2016 | Westberg | F04D 13/025 |
| 2017/0183942 A1 | 6/2017 | Veland | |
| 2018/0179873 A1* | 6/2018 | Artinian | E21B 43/128 |
| 2018/0209425 A1 | 7/2018 | Solberg et al. | |
| 2020/0248538 A1* | 8/2020 | Xiao | F04D 29/0416 |
| 2020/0340480 A1* | 10/2020 | Felix | F04D 13/08 |
| 2021/0123476 A1* | 4/2021 | De Raeve | F16F 15/0237 |
| 2021/0293124 A1 | 9/2021 | Biddick et al. | |
| 2022/0250950 A1* | 8/2022 | Bergstrom | B01D 61/025 |

* cited by examiner

DOWNHOLE LUBRICATION SYSTEM

CROSS-REFERENCE TO RELATED APPLICATION(S)

This application is a divisional and claims the benefit of U.S. application Ser. No. 16/913,642, filed Jun. 26, 2020, which claims the benefit of U.S. Provisional Application No. 62/991,452, filed Mar. 18, 2020, the contents of which are incorporated by reference herein.

TECHNICAL FIELD

This disclosure relates to lubricating downhole-type rotating machines, including downhole compressors, blowers, pumps, and generators.

BACKGROUND

Most wells behave characteristically different over time due to geophysical, physical, and chemical changes in the subterranean reservoir that feeds the well. For example, it is common for well production to decline. This decline in production can occur due to declining pressures in the reservoir, and can eventually reach a point where there is not enough pressure in the reservoir to economically realize production through the well to the surface. Downhole pumps and/or compressors can be deployed into the well to increase production. Additionally, or alternatively, a top side compressor and/or pump are sometimes used to extend the life of the well by decreasing pressure at the top of the well.

SUMMARY

This disclosure relates to lubricating downhole type rotating machines.

An example implementation of the subject matter described within this disclosure is a well tool with the following features. An electric machine is configured to be positioned within a wellbore. The electric machine enclosed within a housing isolates the electric machine from fluids within the wellbore. A first lubrication circuit includes a lubrication reservoir within the housing. The lubrication reservoir is fluidically connected to the electric machine. The first lubrication circuit is configured to provide lubrication to a bearing within the electric machine. A fluid rotor is configured to move or be moved by a fluid within the wellbore. A magnetic coupling couples the fluid rotor and a rotor of the electric machine to rotate in unison. A second lubrication circuit is configured to provide lubrication to a bearing supporting the fluid rotor.

Aspects of the example well tool, which can be combined with the well tool alone or in combination, include the following. The first lubrication circuit includes a lubrication pump within the housing. The lubrication pump is driven by a hydraulic motor. The hydraulic motor is driven by a fluid flow provided by the second lubrication circuit.

Aspects of the example well tool, which can be combined with the well tool alone or in combination, include the following. The well tool further includes an electric motor that is separate from the electric machine and a lubrication pump that is coupled to and driven by the electric motor.

Aspects of the example well tool, which can be combined with the well tool alone or in combination, include the following. A lubrication pump is coupled to and configured to be driven by the electric machine.

Aspects of the example well tool, which can be combined with the well tool alone or in combination, include the following. A speed reducer is located between the electric machine and the lubrication pump.

Aspects of the example well tool, which can be combined with the well tool alone or in combination, include the following. The lubrication reservoir includes a pressure relief valve configured to release fluid into the wellbore when a pressure within the lubrication reservoir exceeds a pressure within the wellbore.

Aspects of the example well tool, which can be combined with the well tool alone or in combination, include the following. The fluid rotor and a first portion of the magnetic coupling are configured to be retrieved from the wellbore while the electric machine. A second portion of the magnetic coupling remains within the wellbore.

An example implementation of the subject matter described within this disclosure is a method of providing lubrication to a downhole tool. The method includes the following features. A first lubricant is flowed, by a first lubrication circuit, to a first set of bearings within an electric machine of the downhole tool. The electric machine includes an electric rotor and an electric stator. The first set of bearings support the electric rotor within the electric stator. The electric machine and the first set of bearings are isolated from a wellbore by a pressure-sealed housing. A second lubricant is flowed to a second set of bearings within a fluid end by a second lubrication circuit. The fluid end includes a fluid rotor and a fluid stator. The second set of bearings supports the fluid rotor within the fluid stator while the second set of bearings are exposed to fluids from the wellbore.

Aspects of the example method, which can be combined with the example method alone or in combination, include the following. The first lubricant is received by a lubrication reservoir prior to flowing the first lubricant.

Aspects of the example method, which can be combined with the example method alone or in combination, include the following. Flowing the first lubricant includes flowing the second lubricant from a topside facility through a hydraulic motor driven by the flowing second lubricant. A lubrication pump by is driven by the hydraulic motor. The first lubricant is at least partly flowed by the lubrication pump. The second lubricant is flowed from the hydraulic motor to the second set of bearings.

Aspects of the example method, which can be combined with the example method alone or in combination, include the following. The first lubricant is received from the first lubrication circuit by a lubrication reservoir within the downhole tool. A pressure within the lubrication reservoir is increased such that the pressure within the lubrication reservoir is greater than a pressure of the wellbore. A lubricant is released by a pressure relief valve to the wellbore responsive to the pressure within the lubrication reservoir being greater than the pressure of the wellbore. A pressure within the reservoir is reduced responsive to releasing the lubricant to the wellbore.

Aspects of the example method, which can be combined with the example method alone or in combination, include the following. Pumping the first lubricant includes receiving electricity by an electric motor. The electric motor is different from the electric machine. The electric motor is within the downhole tool. A downhole lubrication pump is driven by the electric motor.

Aspects of the example method, which can be combined with the example method alone or in combination, include the following. Pumping the lubricant includes driving a downhole lubrication pump by the electric machine.

Aspects of the example method, which can be combined with the example method alone or in combination, include the following. Driving the lubrication pump by the electric machine includes reducing a speed of an input shaft of the pump by a speed reducer.

An example implementation of the subject matter described within this disclosure is an artificial lift system with the following features. An electric machine is configured to be positioned within a wellbore. A housing is configured to pressurize and isolate the electric machine from fluid within the wellbore. A first lubrication circuit includes a lubrication reservoir within the housing. The lubrication reservoir fluidically connects to the electric machine. The first lubrication circuit is configured to provide a first lubricant to a first bearing within the electric machine. A fluid rotor is configured to move or be moved by fluid within the wellbore. A magnetic coupling couples the fluid rotor and a rotor of the electric machine to rotate in unison. A second lubrication circuit is configured to provide a second lubricant to a second bearing supporting the fluid rotor. The second lubrication circuit includes a topside lubrication pump.

Aspects of the example method, which can be combined with the example artificial lift system alone or in combination, include the following. A downhole lubrication pump is configured to flow the first lubricant to the first bearing.

Aspects of the example method, which can be combined with the example artificial lift system alone or in combination, include the following. The topside lubrication pump drives the second lubricant to a hydraulic motor driven by the second lubricant. The hydraulic motor drives the downhole lubrication pump.

Aspects of the example method, which can be combined with the example artificial lift system alone or in combination, include the following. The topside lubrication pump is configured to flow the first lubricant to the first bearing.

Aspects of the example method, which can be combined with the example artificial lift system alone or in combination, include the following. The fluid rotor and a portion of the magnetic coupling are configured to be retrieved from the wellbore while the electric machine remains within the wellbore.

The details of one or more implementations of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

This disclosure describes an artificial lift system that includes a downhole-type rotating machine, such as a compressor, blower, pump, or generator. Use of such artificial lift systems can increase production from wells. In some implementations, the bearing lubrication system of the artificial lift system is isolated from the production fluid via sealed chambers or zones, typically flooded with the lubrication fluid and pressure compensated to the downhole environment to minimize leakage and contamination with the production fluid. While this approach offers use in low speed applications, higher speed applications suffer from the high windage losses from this flooded approach. The artificial lift systems described herein can be more reliable than comparable artificial lift systems with the elimination of a flooded electric machine located downhole. The artificial lift systems described herein also offer improved performance by being able to achieve higher operating speeds, all while using conventional lubricated bearing systems. The downhole-type rotating machine is provided lubrication, at least partially, by an adjustable topside pressure source that is renewed/refilled as needed, where lubrication used in the device is ultimately recovered in the production flow that comes to the topside facility. The modular characteristic of the artificial systems described herein allows for variability in design and customization to cater to a wide range of operating conditions and applications, including wells producing liquid, gas, and combinations of both.

Figure 1:
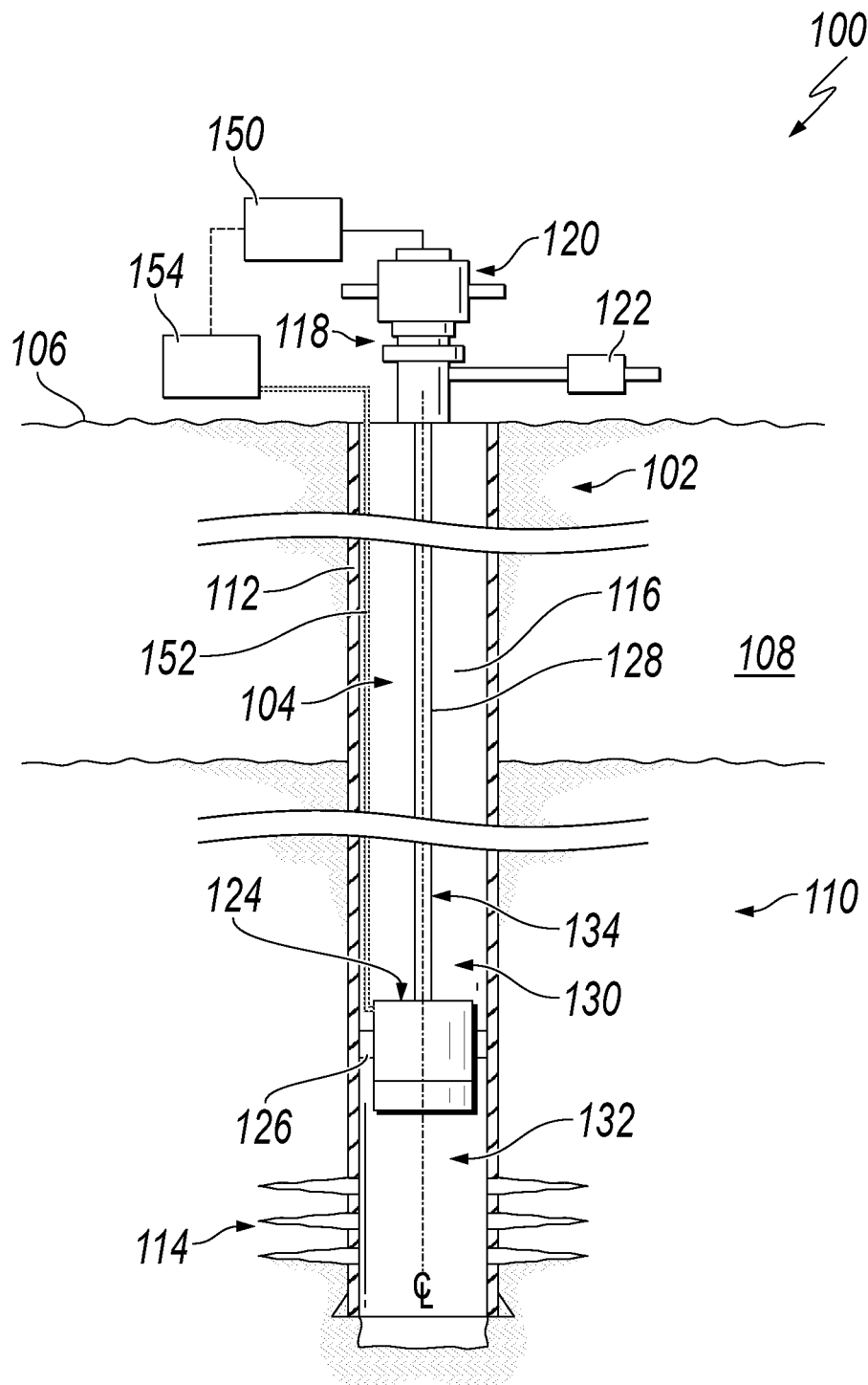
FIG. 1 is a schematic side cross sectional view of an example well system.

FIG. 1 depicts an example well system 100 constructed in accordance with the concepts herein. The well system 100 includes a well 102 having a wellbore 104 that extends from the terranean surface 106 through the earth 108 to one or more subterranean zones of interest 110 (one shown). The well system 100 enables access to the subterranean zones of interest 110 to allow recovery, i.e., production, of fluids to the terranean surface 106 and, in certain instances, additionally or alternatively allows fluids to be placed in the earth 108. In certain instances, the subterranean zone of interest 110 is a formation within the Earth defining a reservoir, but in other instances, the subterranean zone of interest 110 can be multiple formations or a portion of a formation. For the sake of simplicity, the well 102 is shown as a vertical well with a vertical wellbore 104, but in other instances, the well 102 could be a deviated well with the wellbore 104 deviated from vertical (e.g., horizontal or slanted) and/or the wellbore 104 could be one of the multiple bores of a multilateral well (i.e., a well having multiple lateral wells branching off another well or wells).

In certain instances, the well system 100 is used in producing hydrocarbon production fluid from the subterranean zones of interest 110 to the terranean surface 106. The well may produce only dry gas, liquid hydrocarbons, and/or water. In certain instances, the production from the well 102 can be multiphase in any ratio. The well 102 can produce mostly or entirely liquid at certain times and mostly or entirely gas at other times. For example, in certain types of wells, it is common to produce water for a period of time to gain access to the gas in the subterranean zone. The concepts herein, though, are not limited in applicability to gas wells or even production wells, and could be used in wells for producing liquid resources such as oil, water, or other liquid resources, and/or could be used in injection wells, disposal wells, or other types of wells used in placing fluids into the Earth.

The wellbore 104 is typically, although not necessarily, cylindrical. All or a portion of the wellbore 104 is lined with a tubing, i.e., casing 112. The casing 112 connects with a wellhead 118 at the terranean surface 106 and extends downhole into the wellbore 104. The casing 112 operates to isolate the bore of the well 102, defined in the cased portion of the well 102 by the inner bore 116 of the casing 112, from the surrounding earth 108. The casing 112 can be formed of a single continuous tubing or multiple lengths of tubing joined (e.g., threaded and/or otherwise) end-to-end. In FIG. 1, the casing 112 is perforated (i.e., having perforations 114) in the subterranean zone of interest 110 to allow fluid communication between the subterranean zone of interest 110 and the inner bore 116 of the casing 112. In other instances, the casing 112 is omitted or ceases in the region of the subterranean zone of interest 110. This portion of the wellbore 104 without casing is often referred to as "open hole."

The wellhead 118 defines an attachment point for other equipment of the well system 100 to be attached to the well 102. For example, FIG. 1 shows well 102 being produced with a Christmas tree 120 attached to the wellhead 118. The Christmas tree 120 includes valves used to regulate flow into or out of the well 102.

FIG. 1 shows a surface pump/compressor 122 residing on the terranean surface 106 and fluidly coupled to the well 102 through the Christmas tree 120. The surface pump/compressor 122 can include a variable speed or fixed speed pump/compressor. The well system 100 also includes a downhole-type artificial lift system 124 residing in the wellbore 104, for example, at a depth that is at or nearer to subterranean zone of interest 110 than the terranean surface 106. The surface pump/compressor 122 operates to draw down the pressure inside the well 102 at the terranean surface 106 to facilitate production of fluids to the terranean surface 106 and out of the well 102. The downhole-type artificial lift system 124, being of a type configured in size and robust construction for installation within a well 102, assists by creating an additional pressure differential within the well 102. In particular, casing 112 is commercially produced in a number of common sizes specified by the American Petroleum Institute (the "API"), including 4½, 5, 5½, 6, 6⅝, 7, 7⅝, 16/8, 9⅝, 10¾, 11¾, 13⅜, 16, 18⅝ and 20 inches, and the API specifies internal diameters for each casing size. The downhole-type artificial lift system 124 can be configured to fit in and, (as discussed in more detail below) in certain instances, seal to the inner diameter of one of the specified API casing sizes. Of course, the downhole-type artificial lift system 124 can be made to fit in and, in certain instances, seal to other sizes of casing or tubing or otherwise seal to the wall of the wellbore 104.

Additionally, as a downhole-type artificial lift system 124 or any other downhole system configuration such as a pump, compressor, or multi-phase fluid flow aid that can be envisioned, the construction of its components is configured to withstand the impacts, scraping, and other physical challenges that the downhole-type artificial lift system 124 will encounter while being passed hundreds of feet/meters or even multiple miles/kilometers into and out of the wellbore 104. For example, the downhole-type artificial lift system 124 can, in certain instances, be disposed in the wellbore 104 at a depth of 15,000 feet (4,572 meters) or more. Beyond just a rugged exterior, this encompasses having certain portions of any electronics or components sensitive to the downhole environment be ruggedized to be shock resistant and remain fluid tight during such physical challenges and during operation. Additionally, the downhole-type artificial lift system 124 is configured to withstand and operate for extended periods of time (e.g., multiple weeks, months, or years) at the pressures and temperatures experienced in the wellbore 104, temperatures which, in certain instances, can exceed 400° F./205° C. and pressures over 10,000 pounds per square inch, and while submerged in the well fluids (gas, water, or oil as examples). Finally, as a downhole-type artificial lift system 124, the downhole-type artificial lift system 124 can be configured to interface with one or more of the common deployment systems, such as jointed tubing (i.e., lengths of tubing joined end-to-end, threaded, and/or otherwise), a sucker rod, coiled tubing (i.e., not-jointed tubing, but rather a continuous, unbroken and flexible tubing formed as a single piece of material), or wireline with an electrical conductor (i.e., a monofilament or multifilament wire rope with one or more electrical conductors, sometimes called e-line) and thus have a corresponding connector (e.g., coupling 218 discussed below, which can be a jointed tubing connector, coiled tubing connector, or wireline connector). In FIG. 1, the downhole-type artificial lift system 124 is shown deployed on production tubing 128.

A seal system 126 integrated or provided separately with a downhole system, as shown with the downhole-type artificial lift system 124, divides the well 102 into an uphole zone 130 above the seal system 126 and a downhole zone 132 below the seal system 126. FIG. 1 shows the downhole-type artificial lift system 124 positioned in the open volume of the inner bore 116 of the casing 112, and not within or a part of another string of tubing in the well 102. The wall of the wellbore 104 includes the interior wall of the casing 112 in portions of the wellbore 104 having the casing 112, and includes the open-hole wellbore wall in uncased portions of the wellbore 104. Thus, the seal system 126 is configured to seal against the wall of the wellbore 104, for example, against the interior wall of the casing 112 in the cased portions of the wellbore 104 or against the interior wall of the wellbore 104 in the uncased, open-hole portions of the wellbore 104. In certain instances, the seal system 126 can form a gas and liquid tight seal at the pressure differential that the downhole-type artificial lift system 124 creates in the well 102. In some instances, the seal system 126 of the downhole-type artificial lift system 124 seals against the interior wall of the casing 112 or the open-hole portion of the wellbore 104. For example, the seal system 126 can be configured to at least partially seal against an interior wall of the wellbore 104 to separate (completely or substantially) a pressure in the wellbore 104 downhole of the seal system 126 of the downhole-type artificial lift system 124 from a pressure in the wellbore 104 uphole of the seal system 126 of the downhole-type artificial lift system 124. Although FIG. 1 includes both the surface pump/compressor 122 and the downhole-type artificial lift system 124, in other instances, the surface pump/compressor 122 can be omitted and the downhole-type artificial lift system 124 can provide the entire pressure boost in the well 102. While illustrated with the seal system 126, such a seal system can be eliminated in some instances, for example, when a packer and production tubing are used with the downhole-type artificial lift system 124.

In some implementations, the downhole-type artificial lift system 124 can be implemented to alter characteristics of a wellbore by a mechanical intervention at the source. Alternatively or in addition to any of the other implementations described in this disclosure, the downhole-type artificial lift system 124 can be implemented as a high flow, low pressure rotary device for gas flow in sub-atmospheric wells. Alternatively or in addition to any of the other implementations described in this disclosure, the downhole-type artificial lift system 124 can be implemented as a high pressure, low flow rotary device for gas flow in sub-atmospheric wells. Alternatively or in addition to any of the other implementations described in this disclosure, the downhole-type artificial lift system 124 can be implemented as a high flow, low pressure rotary device for gas flow in high pressure wells, that is, wells with a pressure higher than atmospheric pressure. Alternatively, or in addition to any of the other implementations described in this disclosure, the downhole-type artificial lift system 124 can be implemented as a high pressure, low flow rotary device for gas flow in high-pressure wells. Alternatively, or in addition to any of the other implementations described in this disclosure, the downhole-type artificial lift system 124 can be implemented in a direct well-casing deployment for production through the wellbore. While the downhole-type artificial lift system 124 is described in detail as an example implementation of the downhole system, alternative implementations of the downhole system as a pump, compressor, or multiphase combination of these can be utilized in the wellbore to effect increased well production.

The downhole system, as shown as the downhole-type artificial lift system 124, locally alters the pressure, temperature, and/or flow rate conditions of the fluid in the wellbore 104 proximate the downhole-type artificial lift system 124 (e.g., at the base of the wellbore 104). In certain instances, the alteration performed by the downhole-type artificial lift system 124 can optimize, or help in optimizing, fluid flow through the wellbore 104. As described above, the downhole-type artificial lift system 124 creates a pressure differential within the well 102, for example, particularly within the wellbore 104 the downhole-type artificial lift system 124 resides in. In some instances, a pressure at the base of the wellbore 104 is a low pressure (e.g., sub-atmospheric, insufficient to overcome the static head and friction losses of the well, or insufficient for the desired flowrate at the Christmas tree 120), so unassisted fluid flow in the wellbore can be slow or stagnant. In these and other instances, the downhole-type artificial lift system 124 introduced into the wellbore 104 adjacent the perforations 114 can reduce the pressure in the wellbore 104 near the perforations 114 to induce greater fluid flow from the subterranean zone of interest 110, increase a temperature of the fluid entering the downhole-type artificial lift system 124 to reduce condensation from limiting production, and increase a pressure in the wellbore 104 uphole of the downhole-type artificial lift system 124 to increase fluid flow to the terranean surface 106.

The downhole system, as shown as the downhole-type artificial lift system 124, moves the fluid at a first pressure downhole of the downhole-type artificial lift system 124 to a second, higher pressure uphole of the downhole-type artificial lift system 124. The downhole-type artificial lift system 124 can operate at and maintain a pressure ratio across the downhole-type artificial lift system 124 between the second, higher uphole pressure and the first, downhole pressure in the wellbore. The pressure ratio of the second pressure to the first pressure can also vary, for example, based on an operating speed of the downhole-type artificial lift system 124, as described in more detail below. In some instances, the pressure ratio across the downhole-type artificial lift system 124 is less than 2:1, where a pressure of the fluid uphole of the downhole-type artificial lift system 124 (i.e., the second, higher pressure) is at or below twice the pressure of the fluid downhole of the downhole-type artificial lift system 124 (i.e., the first pressure). For example, the pressure ratio across the downhole-type artificial lift system 124 can be about 1.125:1, 1.5:1, 1.75:1, 2:1, or another pressure ratio between 1:1 and 2:1. In certain instances, the downhole-type artificial lift system 124 is configured to operate at a pressure ratio of greater than 2:1.

The downhole system, as shown as the downhole-type artificial lift system 124, can operate in a variety of downhole conditions of the wellbore 104. For example, the initial pressure within the wellbore 104 can vary based on the type of well 102, depth of the well 102, production flow from the perforations 114 into the wellbore 104, and/or other factors. In some examples, the pressure in the wellbore 104 proximate a bottomhole location is sub-atmospheric, where the pressure in the wellbore 104 is at or below about 14.7 pounds per square inch absolute (psia), or about 101.3 kiloPascal (kPa). The downhole-type artificial lift system 124 can operate in sub-atmospheric wellbore pressures, for example, at wellbore pressure between 2 psia (13.8 kPa) and 14.7 psia (101.3 kPa). In some examples, the pressure in the wellbore 104 proximate a bottomhole location is much higher than atmospheric pressure, where the pressure in the wellbore 104 is above about 14.7 pounds per square inch absolute (psia), or about 101.3 kiloPascal (kPa). The downhole-type artificial lift system 124 can operate in above atmospheric wellbore pressures, for example, at wellbore pressure between 14.7 psia (101.3 kPa) and 15,000 psia (103,421 kPa).

A controller 150 for a downhole system, shown as the downhole-type artificial lift system 124, is, in some implementations, located topside to maximize reliability and serviceability. Details about the controller 150 are described later within this disclosure. The controller 150, in some implementations, receives signals from well instrumentation (pressure, flow, temperature), the topside motor VSD (speed, power, torque), the topside oil supply system (lubrication flow, pressure, temperature), and any sensor and/or sensor electronics within the downhole-type artificial lift system 124, and uses this for input as part of its operation and control algorithm. This algorithm output includes a current command to regulate rotor speed and lubrication rates within the downhole-type artificial lift system 124 (details are explained in greater detail later within the disclosure). This loop typically happens very fast, on the order of 1,000-20,000 times a second depending on the system control requirements. This control system is also capable of determining the bearing lubrication requirements based on speed, power, fluid flow, and fluid pressures in the well. Analog circuit based controllers can also perform this function. Having this controller 150 topside allows for easy communication, service, and improved up-time for the system, as any issues can be resolved immediately via local or remote support. Downhole electronics are also an option either proximate to the device or at a location more thermally suitable. In a downhole implementation, the electronics are packaged to isolate them from direct contact with the downhole environment. Downhole electronics, in certain instances, offer better control since they do not suffer with long cable delay and response issues.

Lubrication is provided with a topside pressure source 154. The topside pressure source 154 can include a pump, a flow regulator, a pressure regulator, a pressurized vessel, valving, and any other equipment to provide lubrication to the downhole-type artificial lift system 124. The topside pressure source 154 is fluidically connected to the downhole-type artificial lift system 124 by a main lubrication line 152. In addition to standard lubrication, the topside pressure source 154 can provide well treatment chemicals to the downhole-type artificial lift system 124. Such chemicals can include corrosion inhibitors, defoamers, such as alkoxylated alcohol, paraffin inhibitors, such as xylene, toluene and benzene, wetting agents, such as certain soaps, and hydrate inhibitors, such as methanol or monoethylene glycol (MEG). For especially corrosive chemicals, different metallurgy or coatings could be utilized for bearing systems. These could include nickel and chromium based surface applications, as well as nickel based or super alloys. In addition, ceramic roller elements could be selected for use in more aggressive fluid. The bearing cage material would be selected with the chemical constituents in mind whether they be metallic or thermoplastic. More details on the lubrication system are described throughout this disclosure.

An example downhole system, shown as the downhole-type artificial lift system 124, is depicted schematically in FIG. 1. In the context of this disclosure, an uphole end or direction is an end nearer or moving in a direction towards the terranean surface 106. A downhole end or direction is an end nearer or moving in a direction away from the terranean surface 106. In some implementations, a coupling is positioned at an uphole-end of the downhole-type artificial lift system 124. The coupling can be of a type used for a wireline connection, a tubing connection, or any other connection configured to support the weight of all or part of the downhole-type artificial lift system 124. The coupling, in certain instances, can include a standard attachment method to attach the downhole-type artificial lift system 124 to a support system. For example, a threaded interface can be used for sucker rod, or a set of bolts can be used to attach two flanges together for production tubing.

Figure 2:
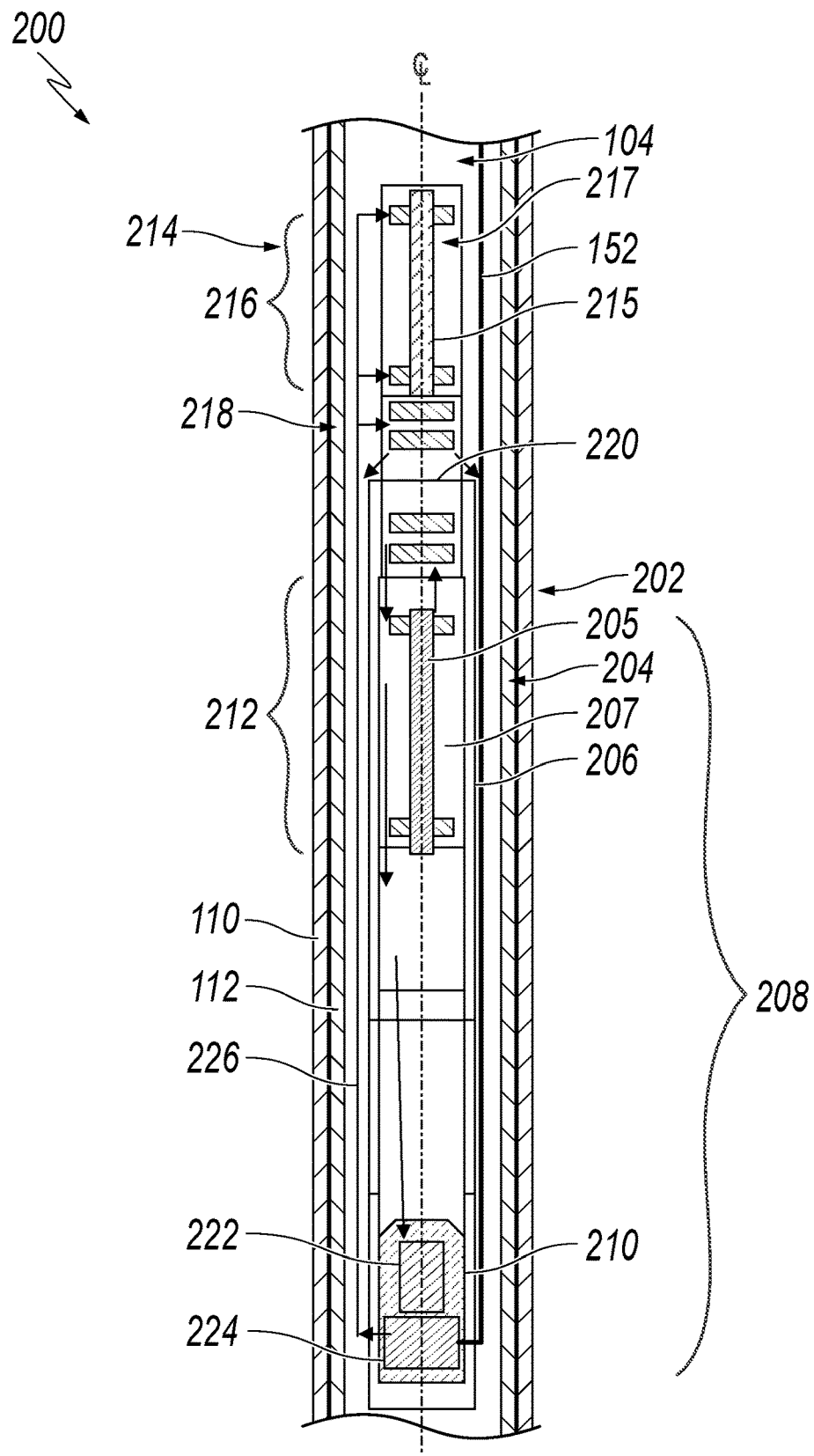
FIG. 2 is a schematic diagram of an artificial lift system within the well incorporating an example lubrication system.

FIG. 2 illustrates an example lubrication system 200 for an example well tool 202. The well tool 202 can be used as the downhole-type artificial lift system 124 previously described. The well tool 202 includes an electric machine 204 configured to be positioned within the wellbore 104 (not shown). The electric machine 204 has a housing 206 fluidically isolating the electric machine 204 from the wellbore 104. Within the housing 206 is a first lubrication circuit 208 that includes a lubrication reservoir 210. The lubrication reservoir 210 is fluidically connected to, and is configured to provide lubrication to, a first set of bearings 212 within the electric machine 204. The first set of bearings 212 carry an electric rotor 205 and are supported by the electric stator 207 of the electric machine 204.

At an uphole end of the well tool 202 is a fluid end 214. The fluid end 214 includes a fluid rotor 215 and a fluid stator 217. The fluid rotor 215 is configured to act upon or be acted upon by the fluid within the wellbore 104. That is, the fluid rotor 215 can move or can be moved by fluid within the wellbore 104. In general, such movement is usually rotational movement, but other movements can include other movements, such as a reciprocating movement. The fluid rotor 215 can include a pump rotor, an impeller, a turbine, a screw, a reciprocating rod, or any other fluid moving component. The fluid stator 217 can include stator vanes, diffusers, or any other static component used to direct fluid through the fluid end 214. The fluid end 214 includes a second set of bearings 216 carrying the fluid rotor 215 and supported by the fluid stator 217.

In between the electric machine 204 and the fluid end 214 is a magnetic coupling 218. The magnetic coupling 218 couples the fluid rotor 215 and a rotor of the electric machine 204 to rotate in unison. The magnetic coupling 218 includes a first coupling rotor and a second coupling rotor magnetically coupled together. Between the first coupling rotor and the second coupling rotor is a can 220. The can 220 fluidically isolates the electric machine 204 from the remainder of the wellbore 104 and components of the well tool 202, including the fluid end 214. The first coupling rotor and second coupling rotor can have a barrel shape with a radial gap arrangement, rotating plates with an axial gap, or a combination of the two. Regardless of the arrangement, the first coupling rotor and the second coupling rotor are separated from one another and fluidically isolated from one another by the can 220. That is, the first coupling rotor is attached or connected to the fluid rotor 215 and is exposed to the wellbore fluid while the second coupling rotor is attached or connected to the electric rotor 205 and is completely isolated from the wellbore fluid. The first coupling rotor can be rotationally supported on the fluid rotor 215 bearings or supported on a separate set of bearings, and the second coupling rotor can be rotationally supported on the electric rotor 205 bearings or supported on a separate set of bearings.

Lubricant is used by both the first set of bearings 212 within the electric machine 204, and the second set of bearings 216 within the fluid end 214. As illustrated, lubrication within the electric machine 204 is completely self-contained and is primarily stored within the lubrication reservoir 210. The lubrication reservoir 210 includes a downhole lubrication pump 222 that is able to circulate the lubricant through the first set of bearings 212 within the electric machine 204 and recover back lubricant into the lubrication reservoir 210. These components make-up a first lubrication circuit 208. This first lubrication circuit 208 is hermetically isolated from the wellbore 104.

The second set of bearings 216 within the fluid end 214 may also require lubrication. As illustrated, lubrication for the second set of bearings 216 within the fluid end 214 is provided by the topside pressure source 154. The topside pressure source 154 flows the lubricant down a lubrication line 152, the lubrication provided by the topside pressure source 154 is then directed to the second set of bearings 216 within the fluid end 214. Once lubricant flows through the second set of bearings 216 within the fluid end 214, any excess lubricant flows into the process fluid.

The topside pressure source 154 can flow the lubricant down a lubrication line 152 and through an isolated part of the lubrication reservoir 210. This isolated part of the lubrication reservoir 210 can be used to drive a hydraulic motor 224. That is, the lubrication flow rotates a small turbine within the hydraulic motor 224. This small turbine, in turn, rotates the downhole lubrication pump 222 within the lubrication reservoir 210. After driving the downhole lubrication pump 222 within the lubrication reservoir 210, the lubrication provided by the topside pressure source 154 is then directed to the second set of bearings 216 within the fluid end 214. Once lubricant flows through the second set of bearings 216 within the fluid end 214, any excess lubricant flows into the process fluid.

While primarily described in the context of bearings within the fluid end 214 and within the electric machine 204, additional bearings, for example, within the magnetic coupling 218, can be lubricated by any of the lubrication systems described herein. For example, the portion of the magnetic coupling 218 that is isolated with the electric machine 204 is lubricated by the first lubrication circuit 208 while the portion of the magnetic coupling 218 coupled to the fluid end 214 is lubricated by the second lubrication circuit 226.

In some implementations, the use of the magnetic coupling 218 allows for easy change-out of the fluid end 214. In such instances, the fluid end 214 and the fluid end portion of the magnetic coupling 218 can be removed while the electric machine 204 and the electric motor portion of the magnetic coupling 218 remain within the wellbore 104. Such flexibility allows the fluid end 214 to be changed out or swapped to be matched with performance characteristics desired for the current production rate and composition of fluid within the wellbore 104. In addition, since the electric machine 204 is isolated from the wellbore 104, the electric machine 204 will have a far greater mean-time-between-failures or mean-time-between-overhauls when compared with the fluid end 214. To facilitate this easy removal and reinstall, lubrication lines may be preinstalled or formed within the housing 206 such that whenever the components are reconnected the lubrication lines and lubrication circuits (224 and 226) are completed.

In operation, the first lubricant is flowed by the first lubrication circuit 208 to a first set of bearings 212 within the electric machine 204 of the downhole tool 202. The electric machine 204 includes an electric rotor 205 and an electric stator 207. The first set of bearings 212 supports the electric rotor 205 within the electric stator 207. The electric machine 204 and the first set of bearings 212 are isolated from a wellbore 104 by a pressure-sealed housing 206. A second lubricant is flowed by the second lubrication circuit 226 to the second set of bearings 216 within the fluid end 214. The fluid end 214 includes a fluid rotor 215 and a fluid stator 217. The second set of bearings 216 supports the fluid rotor 215 within the fluid stator 217. The second set of bearings 216 is exposed to the wellbore 104. That is, the second set of bearings 216 is fluidically exposed to wellbore fluids during operation.

In some implementations, the first lubricant is received by the lubrication reservoir 210 prior to flowing the first lubricant. For example, the lubrication reservoir 210 can be pre-filled before the well tool 202 is installed within a wellbore.

In some implementations, flowing the first lubricant includes flowing the second lubricant from a topside pressure source 154, located at the terranean surface 106, through a hydraulic motor 224 driven by the flowing second lubricant. The downhole lubrication pump 222 can then be driven by the hydraulic motor 224. The first lubricant is driven or flowed at least partly by the downhole lubrication pump 222. The second lubricant is flowed from the hydraulic motor 224 to the second set of bearings 216.

Figure 3:
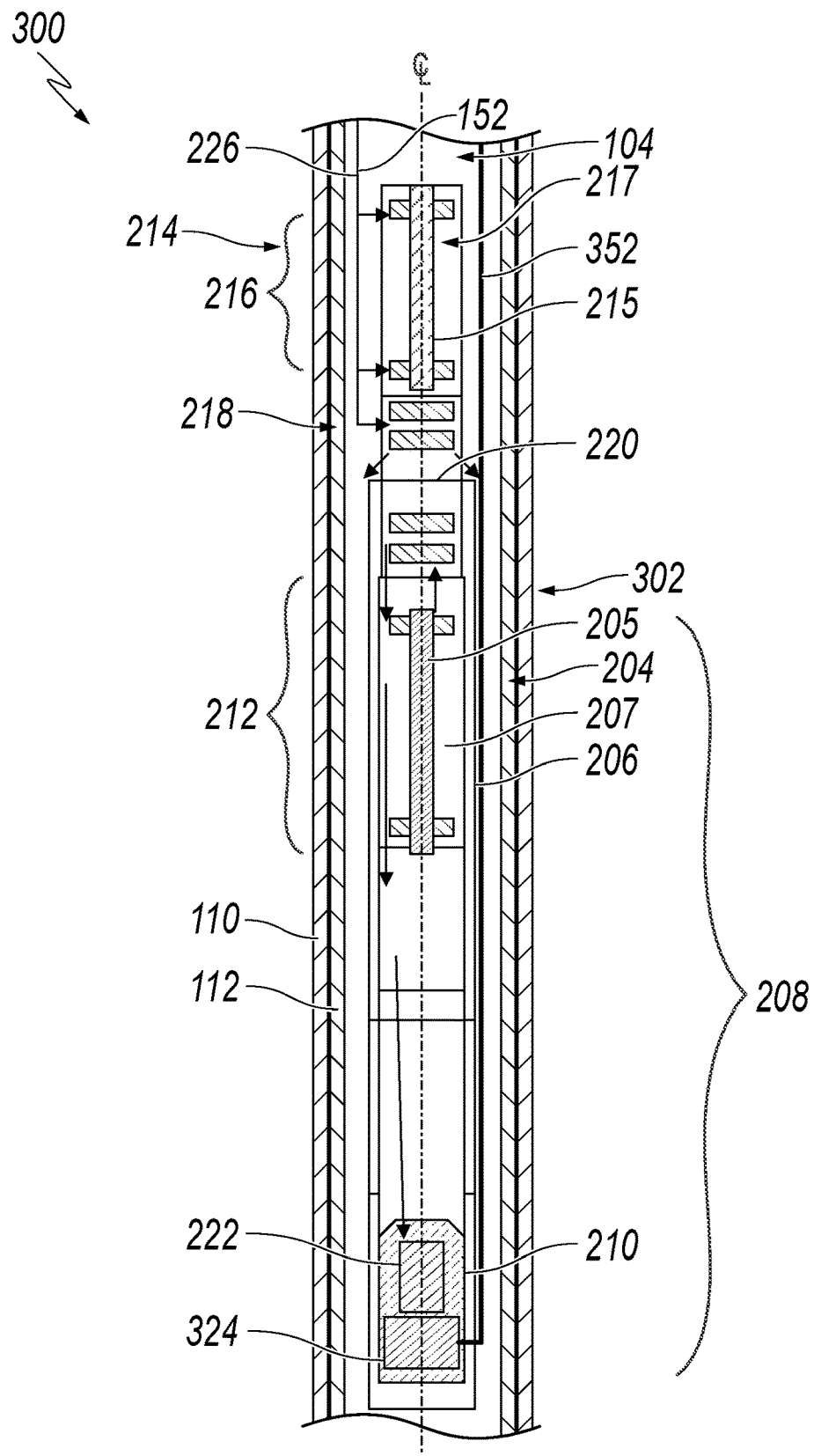
FIG. 3 is a schematic diagram of an artificial lift system within the well incorporating an example lubrication system.

FIG. 3 illustrates an example lubrication system 300 for an example well tool 302. The well tool 302 can be used as the downhole-type artificial lift system 124 previously described. Lubrication system 300 is substantially similar to the lubrication system 200 previously described with the exception of any differences described herein. Similar to the implementation illustrated in FIG. 2, the second set of bearings 216 within the fluid end 214 are lubricated by lubricant supplied from a topside pressure source 154. The first lubrication circuit 208 within the electric machine 204 is similarly isolated. In this implementation, an electric motor 324, separate from the electric machine 204, is used to drive the downhole lubrication pump 222 and circulate the lubricant within the first lubrication circuit 208. In some implementations, the electric motor 324 has power supplied from the topside facility by a power cable 352. Alternatively, or in addition, the electric motor 324 has power supplied from the electric machine 204 itself, directly, taking input power for the electric machine 204 input from the surface motor drive and using to drive the electric motor 324. A power conditioning circuit could be used, which could include electronics, to control the input to the electric machine 324 to provide a constant power, torque, current, voltage or other form or combination for control of lubricate flow. Alternatively, or in addition, an electric generator connected to and driven by the electric machine 204 shaft could be used, whose output used to drive the electric motor 324. A power conditioning circuit could be used, which could include electronics, to control the input to the electric machine 324 to provide a constant power, torque, current, voltage or other form or combination for control of lubricate flow. Alternatively, or in addition, other power sources can be used for the electric motor 324, for example, batteries.

In operation, pumping the first lubricant includes receiving electricity by the electric motor 324. As illustrated, the electric motor 324 is within the well tool 302. More specifically, the electric motor 324 is within the sealed housing 206; however, the electric motor 324 can be located outside of the sealed housing 206 so long as the seal is maintained. For example, a second magnetic coupling or dynamic seal can be used, or the motor and pump can be located in a separate sealed assembly with tubes or other convenes items used to bring lubricate to the pump and carry pumped lubricate to the bearings. Regardless, the downhole lubrication pump 222 is driven by the electric motor 324.

Figure 4:
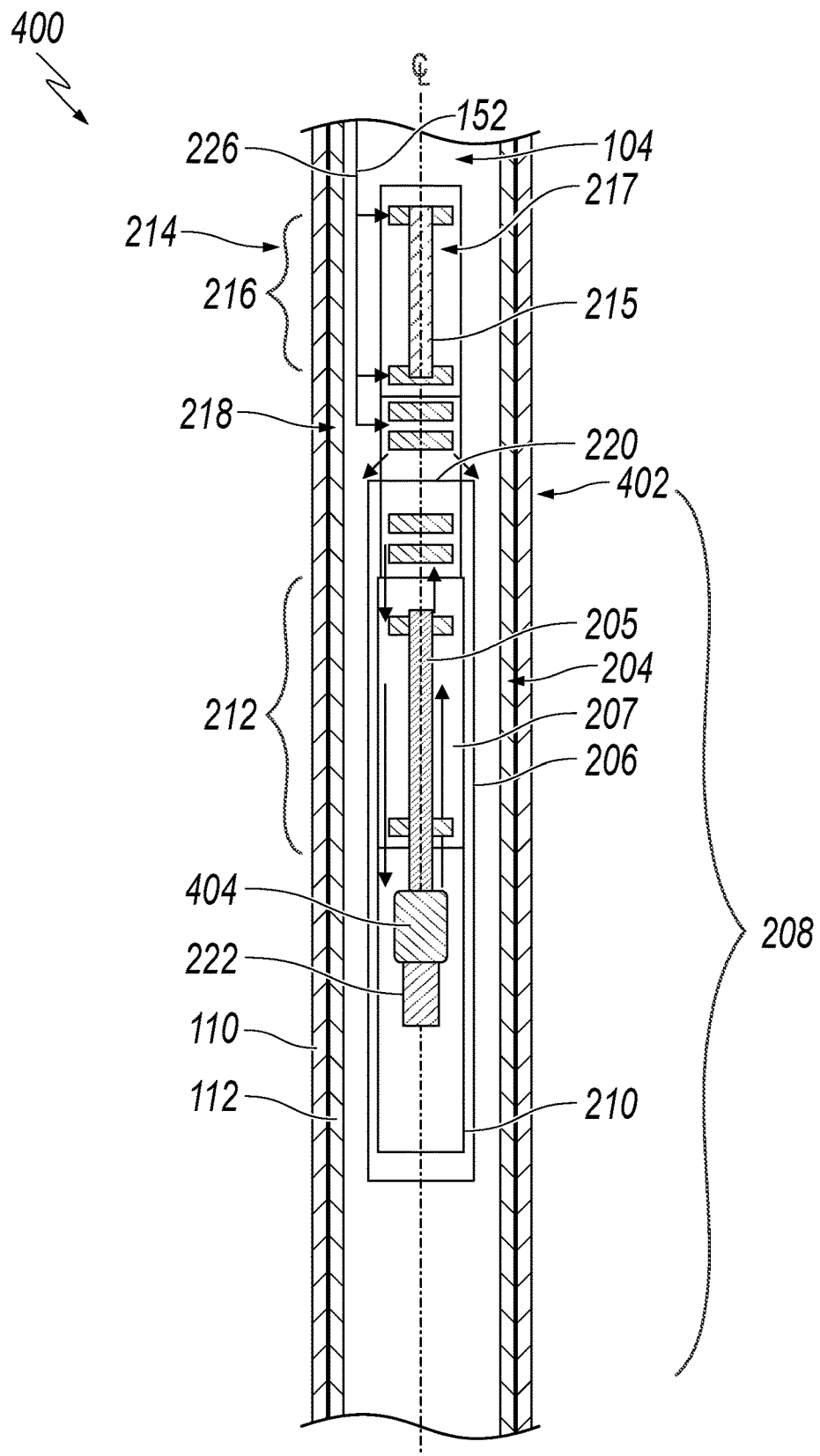
FIG. 4 is a schematic diagram of an artificial lift system within the well incorporating an example lubrication system.

FIG. 4 illustrates an example lubrication system 400 for an example well tool 402. The well tool 402 can be used in place of the downhole-type artificial lift system 124 previously described. The lubrication system 400 can be used in lieu of any of the previously described lubrication systems. Lubrication system 400 is substantially similar to the lubrication system 300 previously described with the exception of any differences described herein. In the illustrated implementation, the downhole lubrication pump 222 within the lubrication reservoir 210 is driven directly by the electric machine 204. In some implementations, the electric machine 204 may spin at too high of a rate for the downhole lubrication pump 222 to operate efficiently. In such implementations, a gearbox or others form of speed reducer 404 can be used between the electric machine 204 and the downhole lubrication pump 222. For example, rotary magnetic gears or fluid couplings can be used.

Figure 5:
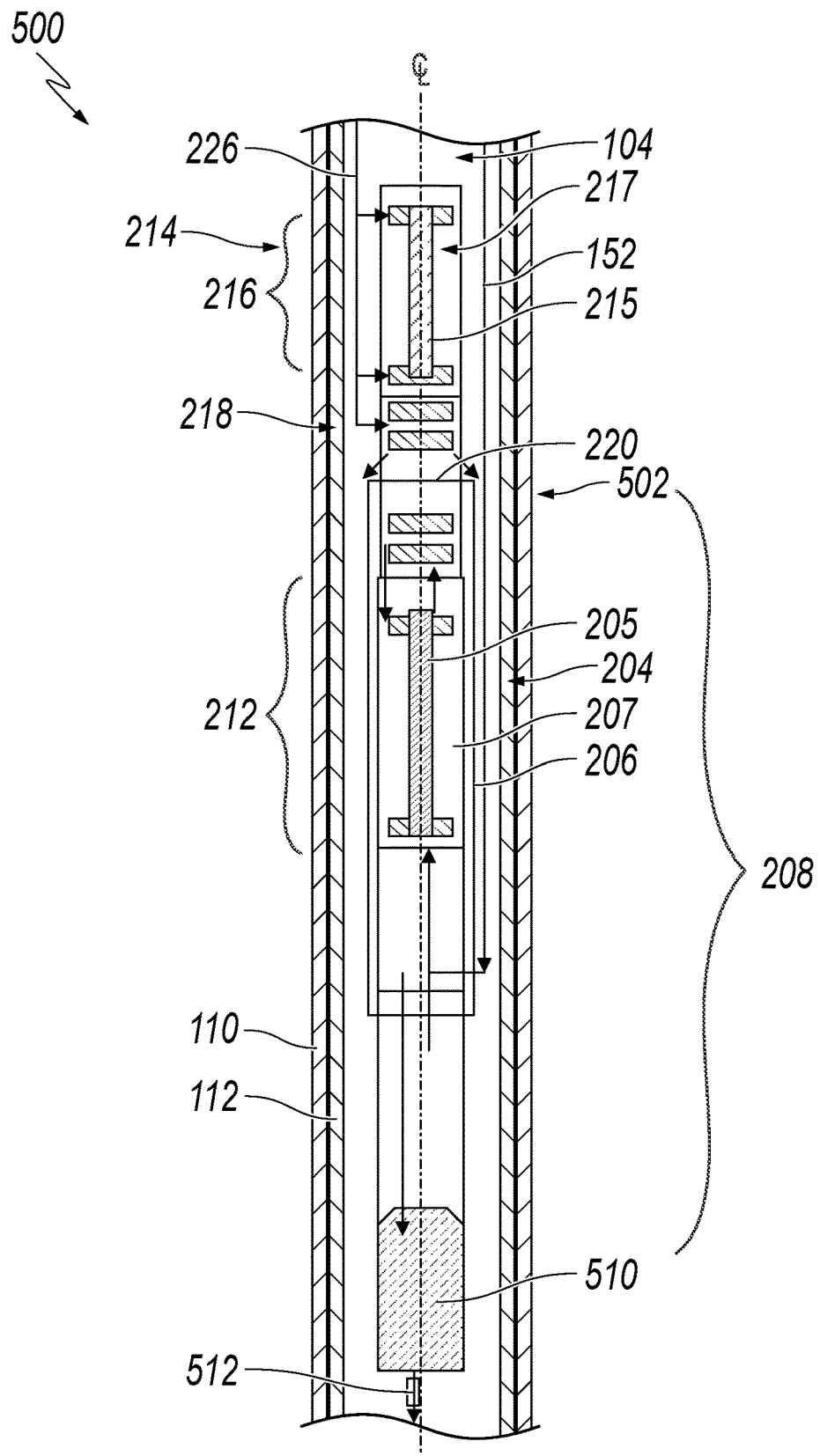
FIG. 5 is a schematic diagram of an artificial lift system within the well incorporating an example lubrication system.

FIG. 5 illustrates an example lubrication system 500 for an example well tool 502. The well tool 502 can be used in place of the downhole-type artificial lift system 124 previously described. The lubrication system 500 can be used in lieu of any of the previously described lubrication systems. Lubrication system 500 is substantially similar to the lubrication system 400 previously described with the exception of any differences described herein. In the illustrated implementation, the second lubrication circuit 226, lubricating the second set of bearings 216 within the fluid end 214, is fed by the topside pressure source 154. Similarly, the first set of bearings 212, within the electric machine 204 and part of the first lubrication circuit 208, is also supplied by the topside pressure source 154. In some implementations, a separate topside pump can be used. In this implementation, the lubricant is flowed by the topside pressure source 154 into the isolated electric machine 204, and then into the downhole lubrication reservoir 510. The downhole lubrication reservoir 510 is equipped with a pressure relief valve 512. The pressure relief valve 512 is set to release contents of the downhole lubrication reservoir 510 when an internal pressure of the downhole lubrication reservoir 510 exceeds a pressure within the wellbore 104. In this arrangement, the lubricant released by the pressure relief valve 512 is then swept into the working fluid through the fluid end 214 towards the Christmas tree 120.

In operation, the first lubricant is received from the first lubrication circuit 208 by a downhole lubrication reservoir 510 within the downhole tool. A pressure within the downhole lubrication reservoir 510 is increased as the lubricate column height increases such that the pressure within the downhole lubrication reservoir 510 is greater than a pressure within the wellbore 104. The lubricant is released, by a pressure relief valve 512, to the wellbore 104 in response to the pressure within the downhole lubrication reservoir 510 being greater than the pressure of the wellbore 104. The pressure relief valve 512 to the wellbore 104, reacting to the higher pressure in the downhole lubrication reservoir 510, prevents the well fluids from entering the downhole lubrication reservoir 510. A pressure within the downhole lubrication reservoir 510 is reduced in response to releasing the lubricant to the wellbore 104.

Figure 6:
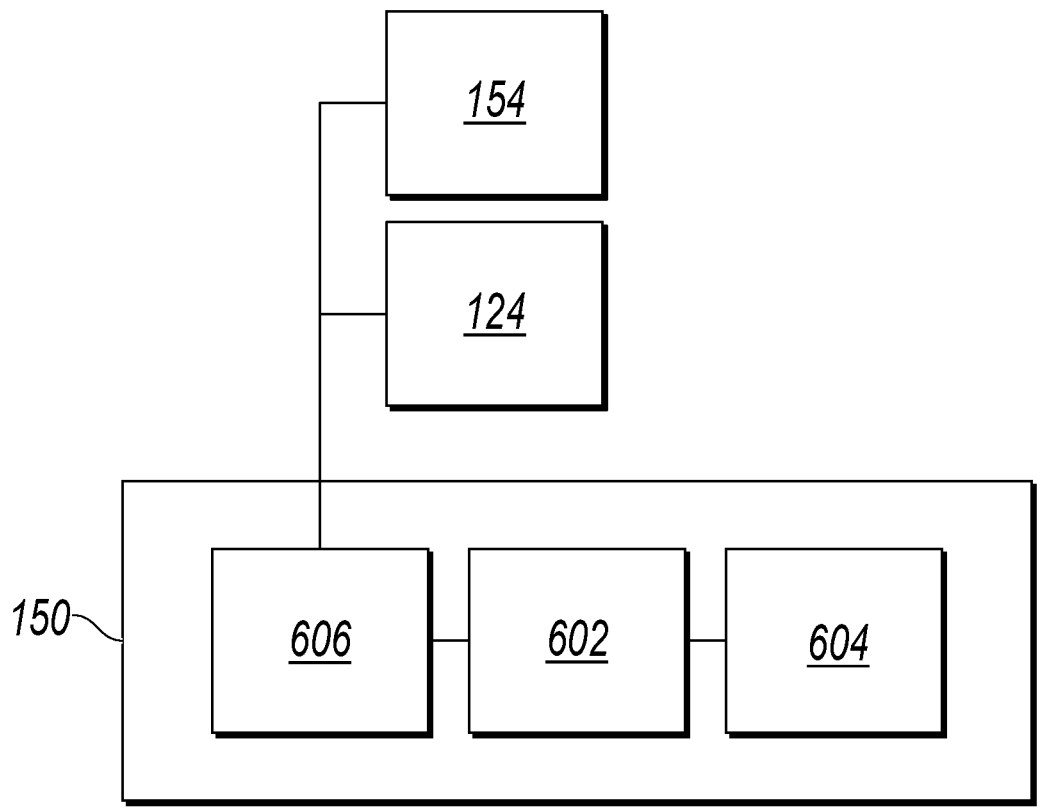
FIG. 6 is a schematic block diagram of an example controller that can be used with aspects of this disclosure.

FIG. 6 is a block diagram of the controller 150. As shown in FIG. 6, the controller 150 can include one or more processors 602 and non-transitory memory 604 containing instructions to facilitate sending and receiving signals through an input/output (I/O) interface 606. The controller can communicate with any aspect of the downhole-type artificial lift system 124, or topside components, for example, the topside pressure source 154. In some implementations, the controller 150 can be entirely located at the surface outside the wellbore 104. In some implementations, the controller 150 can be located within the wellbore 104. In some implementations, the controller can be a distributed controller; for example, a portion of the controller 150 can be located within the wellbore 104, while another portion of the controller 150 can be located at the surface outside the wellbore 104. In some implementations, the controller 150 can be only or in part an analog circuit based control.

The present disclosure is also directed to a method of monitoring, controlling, and using the downhole-type artificial lift system 124. To monitor and control the downhole-type artificial lift system 124, the controller 150 is used in conjunction with sensors (e.g., velocity sensors, transducers, thermocouples, flow sensors, fluid composition sensors) to measure parameters of the production fluid and the downhole-type artificial lift system 124 at various positions within the wellbore 104. Input and output signals, including the data from the sensors, controlled and monitored by the controller 150, can be logged continuously by the controller 150 and stored in a memory 604 coupled to the controller 150. The input and output signals can be logged at any rate desirable by the operator of the downhole-type artificial lift system 124. The controller 150 can also be used to operate and control any motors, bearings, valves, or flow control devices disclosed herein. For example, the controller 150 can be used to control the topside pressure source 154. Furthermore, the controller 150 can be used with the downhole-type artificial lift system 124 to operate the downhole-type artificial lift system 124 in any matter described herein. In some implementations, the controller 150 can be used to operate other devices, such as a topside pump, compressor, or separator in conjunction with the downhole-type artificial lift system 124.

The memory 604 can store programming instructions for execution by the one or more processors 602. For example, the processors can execute programming instructions to measure and/or monitor a parameter detected by various sensors. The controller 150 interprets the signal from sensors and directs the topside pressure source 154 to provide lubrication to the bearings at a specified rate. In another example, the controller 150 can take a measured parameter of the downhole-type artificial lift system 124 and change a rate of lubrication to the bearings in response to the measured parameter. Alternatively, or in addition, the one or more processors 602 can execute programing instructions to determine future well-flow characteristics based on a flow assurance model and control a speed of the rotor based on the future well-flow characteristics.

A number of implementations of the invention have been described. Nevertheless, it will be understood that various modifications may be made without departing from the spirit and scope of the invention. Accordingly, other implementations are within the scope of the following claims.

What is claimed is:

1. A method of providing lubrication to a downhole tool, the method comprising:
    flowing a first lubricant, by a first lubrication circuit, to a first set of bearings within an electric machine of the downhole tool, the electric machine comprising an electric rotor and an electric stator, the first set of bearings supporting the electric rotor within the electric stator;
    isolating the electric machine and the first set of bearings, by a pressure-sealed housing, from a wellbore;
    flowing a second lubricant, by a second lubrication circuit, to a second set of bearings within a fluid end, the fluid end comprising a fluid rotor and a fluid stator, the second set of bearings supporting the fluid rotor within the fluid stator while the second set of bearings are exposed to fluids from the wellbore;
    receiving electricity by an electric motor, the electric motor being different from the electric machine, the electric motor being within the downhole tool; and
    driving a downhole lubrication pump by the electric motor.

2. The method of claim 1, further comprising receiving the first lubricant by a lubrication reservoir prior to flowing the first lubricant.

3. The method of claim 1, where flowing the first lubricant comprises:
    flowing the second lubricant from a topside facility through a hydraulic motor driven by the flowing second lubricant;
    driving a lubrication pump by the hydraulic motor; flowing the first lubricant at least partly by the lubrication pump; and
    flowing the second lubricant from the hydraulic motor, to the second set of bearings.

4. The method of claim 1, further comprising:
    receiving the first lubricant from the first lubrication circuit by a lubrication reservoir within the downhole tool;
    increasing a pressure within the lubrication reservoir such that the pressure within the lubrication reservoir is greater than a pressure of the wellbore;
    releasing the first lubricant, by a pressure relief valve, to the wellbore responsive to the pressure within the lubrication reservoir being greater than the pressure of the wellbore; and
    reducing a pressure within the reservoir responsive to releasing the first lubricant to the wellbore.

5. The method of claim 1, where flowing the first lubricant comprises:
    driving the lubrication pump by the electric machine.

6. The method of claim 5, where driving the lubrication pump by the electric machine comprises reducing a speed of an input shaft of the lubrication pump by a speed reducer.

7. A method of providing lubrication to a downhole tool, the method comprising:
- flowing a first lubricant, by a first lubrication circuit, to a first set of bearings within an electric machine of the downhole tool, the electric machine comprising an electric rotor and an electric stator, the first set of bearings supporting the electric rotor within the electric stator;
- isolating the electric machine and the first set of bearings, by a pressure-sealed housing, from a wellbore;
- flowing a second lubricant, by a second lubrication circuit, from a topside facility through a hydraulic motor driven by the flowing second lubricant to a second set of bearings within a fluid end, the fluid end comprising a fluid rotor and a fluid stator, the second set of bearings supporting the fluid rotor within the fluid stator while the second set of bearings are exposed to fluids from the wellbore; and
- driving a lubrication pump by the hydraulic motor, wherein the first lubricant is flowed at least partly by the lubrication pump.

* * * * *